Figure 1:
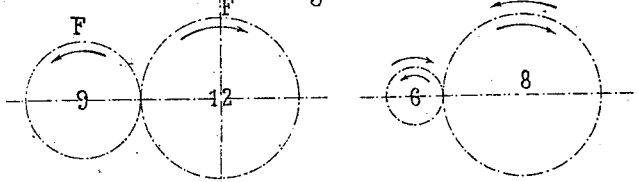

No. 614,709. Patented Nov. 22, 1898.
G. DUPONT & M. JOHANNET.
MEANS FOR DRIVING RAILWAY, TRAMWAY, OR AUTOMOBILE CARS.
(Application filed Oct. 29, 1896.)

(No Model.)

Witnesses

Inventors

United States Patent Office.

GUSTAVE DUPONT AND MAXIME JOHANNET, OF PARIS, FRANCE.

MEANS FOR DRIVING RAILWAY, TRAMWAY, OR AUTOMOBILE CARS.

SPECIFICATION forming part of Letters Patent No. 614,709, dated November 22, 1898.

Application filed October 29, 1896. Serial No. 610,461. (No model.)

*To all whom it may concern:*

Be it known that we, GUSTAVE DUPONT and MAXIME JOHANNET, citizens of France, and residents of Paris, in the Department of the Seine, France, have invented a new and useful Improvement in Means for Driving Railway, Tramway, and Automobile Cars, of which the following is a specification.

Our invention relates to a compound system of traction by petroleum-motors and dynamo-electric machines, which system is applicable to motor-cars and vehicles of any description—that is to say, this system allows of the independence of the vehicles from one another and also from a central station or point of production of power.

By using heavy hydrocarbons the danger of explosion is avoided, the vehicles start easily and without jerking, and the vehicle can travel forward and backward as safely and as quickly as desired without any shock of the gearing.

By the use of electricity as an intermediary we overcome the difficulty experienced in starting, which is a serious drawback in nearly all petroleum-motors, without, however, losing any of their advantages, which are the absence of reservoirs subjected to high pressures, the avoidance of frequent returns to the station for recharging, and the complete independence of the vehicles.

In carrying out the invention we couple the field-magnets of an electric generator to a petroleum-motor kept in constant revolution and couple the armature to one of the axles of the vehicle.

To keep the vehicle stationary while the motor is in motion, the external circuit of the generator is broken, and no current is then produced. If this outer circuit be closed and a high resistance be inserted by means of a suitable rheostat, a weak current is generated. Consequently the armature of the generator becomes excited by the field-magnets and tends to revolve in the same direction; but it is prevented from doing so by the resistance to the rolling movement, which is opposed to the movement of the vehicle. By diminishing the electrical resistance in the outer circuit the power generated by the dynamo increases and produces an increase in the tangential force. Thus there will finally be a moment at which this increased force overcomes the resistance of the wheels of the vehicle and starts the vehicle. At this moment the armature of the dynamo begins to revolve in the same direction as the field-magnets, thereby causing a reduction in speed of the magnets relatively to that of the armature, and consequently also in the absolute speed of the dynamo. As the electromotive force decreases the power generated becomes less, and consequently also the work done by the motor; but this is no consequence, as the power required for driving the vehicle is considerably less than that required for starting it. The outcome of this is a tendency to establish a state of equilibrium between the absolute speed of the dynamo and that of the armature, and thus the power exerted in driving the vehicle will be in constant ratio to the work performed by the petroleum-motor.

It has been here supposed, for convenience sake, that the resistance in the outer circuit has been varied by means of a rheostat; but it is clear that the application of a rheostat would not be advantageous, as it would require the expenditure of energy not only to drive the vehicle, but also to heat the rheostat. This arrangement is, however, rendered economical by sending the current from the dynamo into a suitable electric motor having its armature keyed upon the second axle of the vehicle, a rheostat being interposed between the two armatures, so as to enable the speed of the vehicle to be varied and the starting to be regulated.

One object of our invention is to provide an elastic reversible coupling between the petroleum-motor and the vehicle, as described hereinafter.

Figure 2:
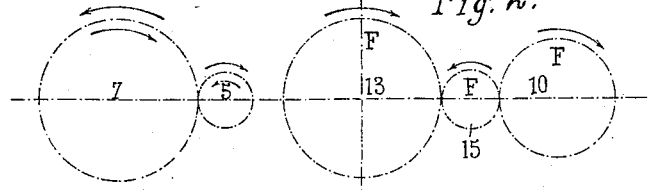
Figure 3:
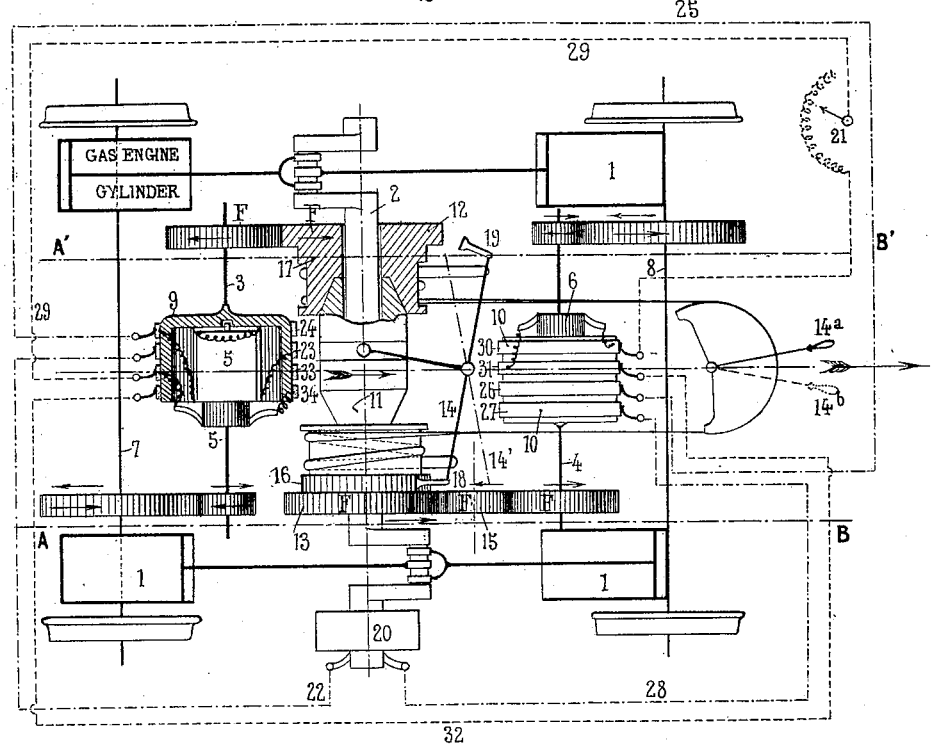

In the accompanying drawings, Figures 1, 2, and 3 are diagrammatic views showing, respectively, the general arrangement of motor mechanism constructed according to this invention, Fig. 1 being taken on the line A' B' and Fig. 2 being taken on the line A B of Fig. 3.

In the three figures the inner arrows, Figs. 1' and 2, and those drawn on the toothed wheels or other parts in Fig. 3 indicate the direction of movement of these parts when the vehicle is moving forward, while the outer arrows correspond to the backward movement, and the letter F of any of the parts denotes that it is fast.

The arrangement shown comprises a petroleum-motor having 4 cylinders 1 1, Fig. 3, arranged to act on the main shaft 2 through the medium of cranks on said shaft. It also comprises two dynamos of the Johannet-Dupont type, in which both the field-magnet and the armature revolve simultaneously in opposite directions and may be connected by any suitable gearing to separate shafts. A dynamo having this characteristic feature is shown and described in French Letters Patent bearing date April 14, 1893. The two generators employed in this instance have their armatures 5 and 6 connected, respectively, to the fore axle 8 and the rear axle 7 of the vehicle, while their magnets 9 and 10 are revolved when required by the shaft 2 of the petroleum-motor. For this purpose they are connected to the motor by an expansion-clutch, which keeps the front field-magnet stationary while the rear one revolves, or vice versa, the rear magnet always turning in the opposite direction to that of the front field-magnet owing to an intermediate pinion 15. This friction-clutch is an expansion-clutch, which is, as is well known, very powerful. The sleeve 11 is splined upon the driving-shaft 2 and can be moved along this shaft by means of a cross-bar 14, connected to the starting-lever 14ª. This cross-bar 14 governs at the same time a double Lemoine brake and two holding-pawls 18 and 19.

The Lemoine brake employs a tapered rope or one of gradually-increasing diameter, which is wound several times around a running shaft or drum, the thick end of said rope being connected to the brake-bar, while the thinner or smaller end is so connected that a suitable tension can be imparted whenever it is necessary to set the brake. A moderate pull upon the small end of the rope draws the coils on the shaft into sufficient frictional contact therewith to cause these convolutions to turn with the shaft, and the pull of the thicker end upon the brake-bar tightens said coils upon the shaft and increases the frictional engagement in proportion to the tension upon the end connected to the brake-bar. In the present instance the lever 14ª controls a half-drum 1ª, over which pass the thin ends of the ropes 2ª and 2ᵇ, which are wound over drums 3ª 3ᵇ, which turn with the wheels 12 and 13. The thick ends of the ropes are connected to the cross-bar 14 near its ends. By moving the lever from the position 14ª to the position 14ᵇ the sleeve 11 leaves the wheel 12 and engages the wheel 13, and at the same time the brake which acted upon the wheel 13 leaves the latter and the other brake instantaneously makes fast the wheel 12. To prevent this wheel 12 turning rearwardly under the magnetic attraction or through the accidental reversal of the brake, the pawl 19 engages in the toothed wheel 17. These pawls could be kept in contact with the teeth of the wheels; but they would then cause a disagreeable clanking noise during the movement of the vehicle. To avoid this noise, they are fixed to the cross-bar 14, which brings them in or out of mesh with the wheels when required.

Alterations in speed are effected in two ways, viz: Ordinary or slight alterations are caused by varying the admission into the cylinders of the petroleum-motor, while quick changes are produced by altering the resistance of the rheostat 21 interposed between the two dynamos.

It is obvious that the two machines 5 9 and 6 10 are identical. There is no distinction between them; but there is a great difference in their operative action. In the position illustrated for the lever 14ª the car goes forward. The field-magnet 9 is driven by the petroleum-motor. This rotation has two effects: first, the armature 5 is compelled to turn in the same direction, the machine 5 9 acting then as an elastic coupling between the vehicle and the motor; second, but at the same time the machine 5 9 acts as an electric generator, because the magnet 9 rotates with a greater speed than the armature 5. The current thus produced is sent in the armature 6, and as the magnet 10 is kept in rest the machine 6 10 will act as a motor, the armature 6 will be set in rotation and propel the vehicle by means of the illustrated gearing.

It is also obvious that this device is reversible.

We may also suppose the dynamos are series wound or shunt-wound, and in these cases there will necessarily be a switch to reverse the current. This switch will be carried by the starting-lever.

It will be seen that the dynamos are generators or motors as the vehicle travels forward or backward.

Having now particularly described and ascertained the nature of our invention and in what manner the same is to be performed, we declare that what we claim is—

1. In a motor-vehicle the combination with a front and rear axle, of two separate dynamos each having its armature and field-magnets upon separate shafts, and each having its armature geared to an axle, a suitable mechanical motor to drive a main shaft, means for communicating the revolution of the main shaft to either of the dynamos, and for releasing the connection between the main shaft and the other dynamo, and a single circuit including the armature of both dynamos, substantially as described.

2. In a motor-vehicle, the combination with a front and rear axle, of two separate dynamos each having its armature and field-magnets upon separate shafts, and each having its armature geared to an axle, a main shaft and a suitable mechanical motor for driving the same, loose gears on said main shaft operatively geared with the respective shafts of the field-magnets, a sliding clutch member splined on the main shaft and movable into engagement with either of said loose gears whereby to communicate the revolution of the main shaft to either of the dynamos and thereby release the connection between the main shaft and the other dynamo, brake mechanism operating in unison with said clutch to prevent the released gear from revolving, and a single circuit including the armatures of both dynamos, substantially as described.

3. In a motor-vehicle, the combination of a front and rear axle of two counter-shafts, a field-magnet and armature mounted on each, a main shaft geared to both counter-shafts, a reversible clutch on the main shaft and a single circuit including the armature of both dynamos, substantially as described.

4. In a motor-vehicle, the combination with a front and rear axle of two counter-shafts, one geared to each axle, a main shaft geared to the two counter-shafts, a field-magnet on each counter-shaft, a single circuit including the field-coils of both dynamos, a single circuit including the two armature-windings, and a variable resistance included in the armature-circuit, substantially as described.

In testimony whereof we have signed this specification in the presence of two subscribing witnesses.

GUSTAVE DUPONT.
MAXIME JOHANNET.

Witnesses:
GEORGES DELOM,
EDWARD P. MacLEAN.